C. B. GRAY.
MACHINE FOR CUTTING SHEET METAL.
APPLICATION FILED MAY 8, 1918.

1,298,930.

Patented Apr. 1, 1919.
3 SHEETS—SHEET 1.

Inventor
Charles B. Gray
Cyrus Kehr
Attorney

C. B. GRAY.
MACHINE FOR CUTTING SHEET METAL.
APPLICATION FILED MAY 8, 1918.
1,298,930.
Patented Apr. 1, 1919.
3 SHEETS—SHEET 2.
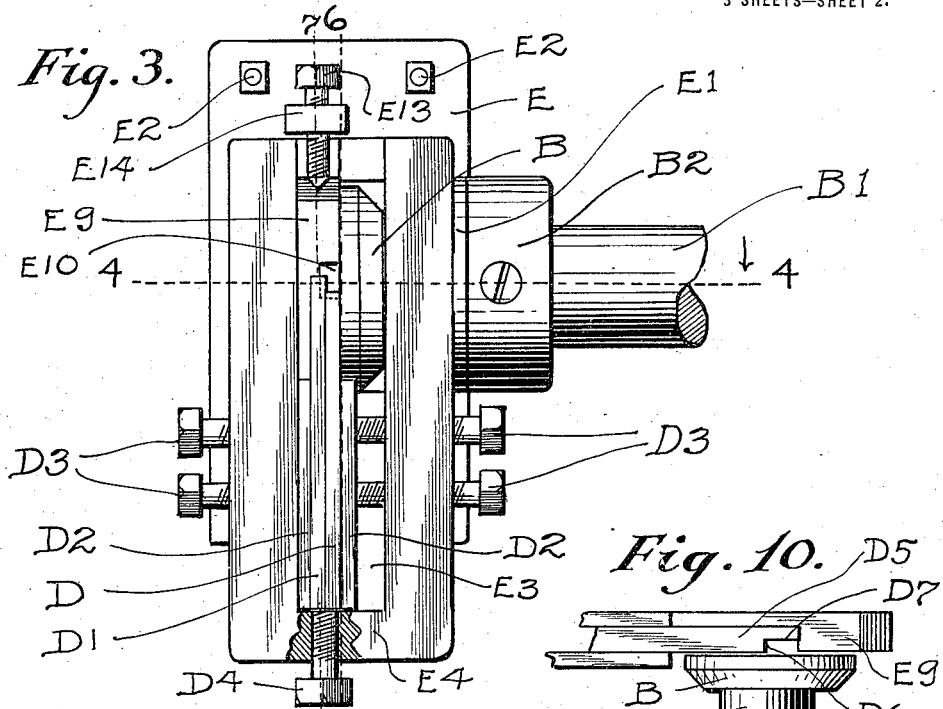
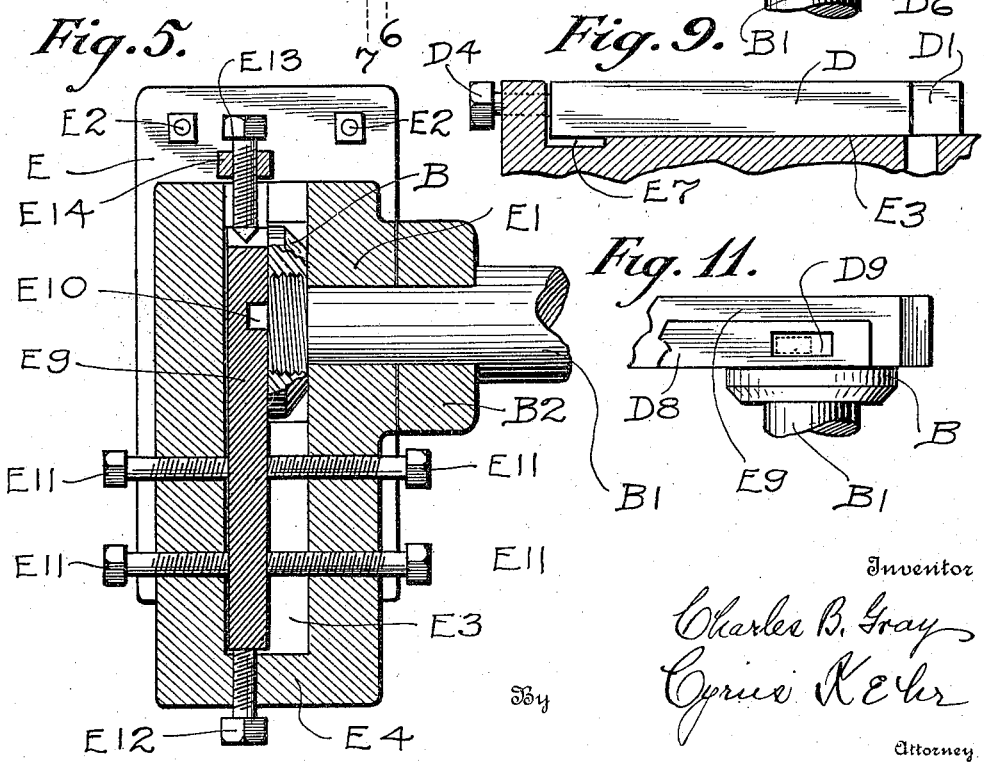
Inventor
Charles B. Gray
Cyrus K Ehr
By
Attorney C. B. GRAY.
MACHINE FOR CUTTING SHEET METAL.
APPLICATION FILED MAY 8, 1918.
1,298,930.
Patented Apr. 1, 1919.
3 SHEETS—SHEET 3.
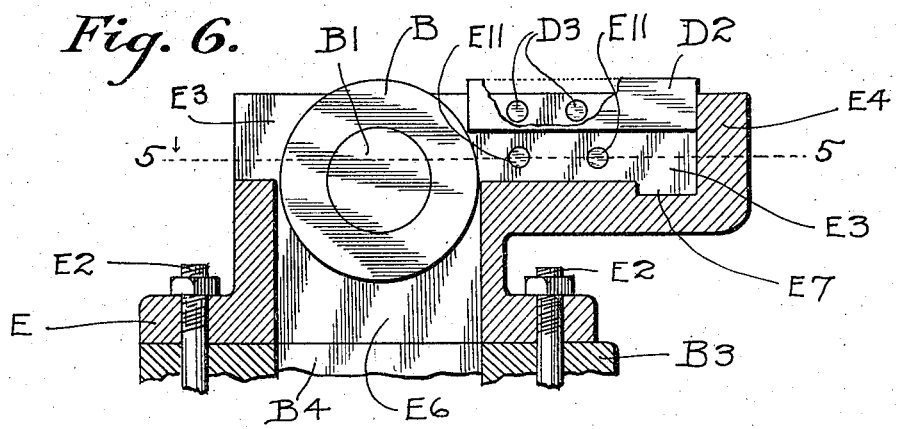
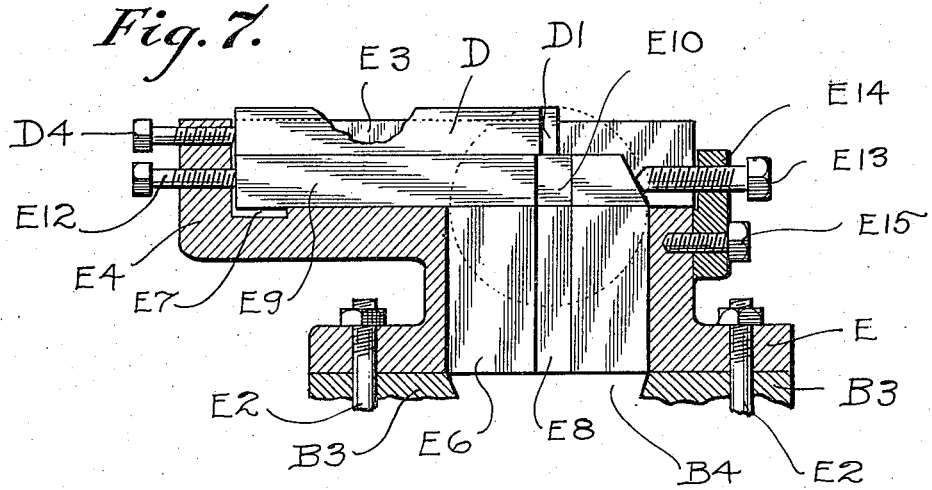
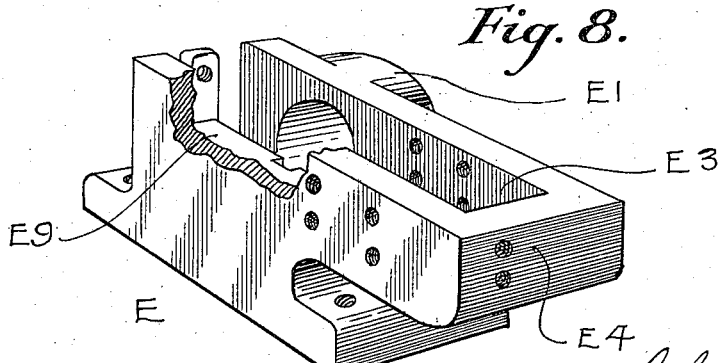

UNITED STATES PATENT OFFICE.

CHARLES B. GRAY, OF KNOXVILLE, TENNESSEE.

MACHINE FOR CUTTING SHEET METAL.

1,298,930.  Specification of Letters Patent.  Patented Apr. 1, 1919.

Application filed May 8, 1918. Serial No. 233,192.

*To all whom it may concern:*

Be it known that I, CHARLES BAXTER GRAY, a citizen of the United States, residing at Knoxville, in the county of Knox and State of Tennessee, have invented a new and useful Improvement in Machines for Cutting Sheet Metal, of which the following is a specification, reference being had to the accompanying drawing.

My improvement relates particularly to machines for cutting sheet form material, which machines contain or embody means for feeding a sheet, a reciprocatory cutter at one side of the sheet plane, and cutting means located at the other side of the sheet plane and coöperating with the front and side edges of the reciprocatory cutter.

My present improvement is applicable to the machine of Letters Patent of the United States, No. 1,098,376 and No. 1,098,377, granted to me June 2, 1914, the first for a "machine for cutting sheet metal" and the second for a "machine for cutting sheet form material," and for convenience in description reference is made to said patents.

The object of this invention is to facilitate the adjustment of the portion of the cutting mechanism located below the sheet plane; such adjustment being made for the purpose of making proper engagement with the upper cutting member and for removing and repairing the lower cutter bar and for replacing one lower cutter bar with another when one which has been used has been worn to such extent as to make substitution desirable or when it is desired to change the width of the cut by the substitution of a wider or a narrower upper cutting member, etc.

A further object of the invention is to provide efficient and substantial means for supporting the working end of the lower cutter bar or bars to provide resistance to the downward pressure exerted by the upper reciprocatory cutter during its downward movement. In my above-mentioned patents, some of the drawings show two such bars. In some of the drawings, a ring on the lower feed shaft forms a support for the working end of such bar or bars, while in others of those drawings there is no support for the working end of said bar or bars. For the cutting of sheet-form materials which offer no high degree of resistance to the downward movement of the upper reciprocatory cutter, these forms are effective and sufficient. But for cutting thick sheets or plates of metal, the downward pressure exerted by the upper reciprocatory cutter must be so great as to call for ample support of the working end of the cutter bar or bars. In this connection, it is to be noted that when thick plates or sheets of metal are cut in a machine in which the ring on the lower feed shaft forms a support for the working end of the lower bar or bars, the ring becomes battered through downward pressure received from said bar or bars. It is also to be noted that in said form and the new form to be herein-described, the working strain is on the working or cutting end of said bar or bars, and that the means used for engaging said bars between their ends receive such strain to only a limited extent, the function of said means being chiefly to position said bars. Furthermore, said supporting ring is supported on the lower feed shaft, and downward pressure put upon said ring is transmitted to said shaft and affects the latter and the bearing in which it rests. Said shaft constitutes an over-hanging support, and it is recognized that an over-hanging support is not substantial.

In the form herein-described, the cutter bar support is entirely independent of said shaft and said shaft bearing.

In considering the lower cutting mechanism the fact must be kept in mind that no part of the cutter bar or bars and no member concerned with the positioning or securing of the cutter or cutters must reach upward into the sheet plane. This puts a limitation upon the task of positioning and securing the cutters.

A further object of the invention is to provide a support for the lower cutter bar in such form as to adapt the support to easy manufacture.

A further object of the invention is to provide a construction adapted to easy and free discharge of cuttings from the cutting mechanism.

In the accompanying drawings,

Fig. 3 is a plan of the portion of the cutting mechanism which is located below the sheet plane;

Fig. 5 is a horizontal section on the line, 5—5, of Figs. 1 and 6;

Fig. 6 is an upright section on the line, 6—6, of Fig. 3, looking toward the right;

Fig. 7 is an upright section on the line, 3—3, looking toward the left;

Fig. 8 is a perspective view of the chair, portions being broken away, and parts to be applied to the chair being omitted;

Fig. 9 is an upright detail section showing the lower cutter bars supported directly on the chair, the supporting bar being omitted;

Fig. 10 is a detail plan showing the two cutter bars of the preceding figures combined to constitute a single bar;

Fig. 11 is a similar detail plan showing a single lower cutter bar in a different form.

Figure 1:
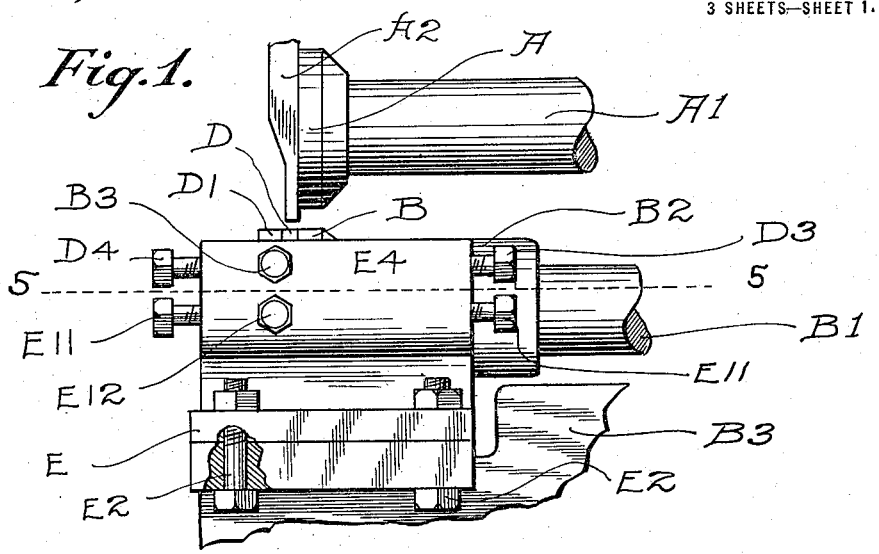
Figure 1 is a front elevation illustrating as much of a cutting mechanism as is concerned with the embodiment of my improvement.
Figure 2:
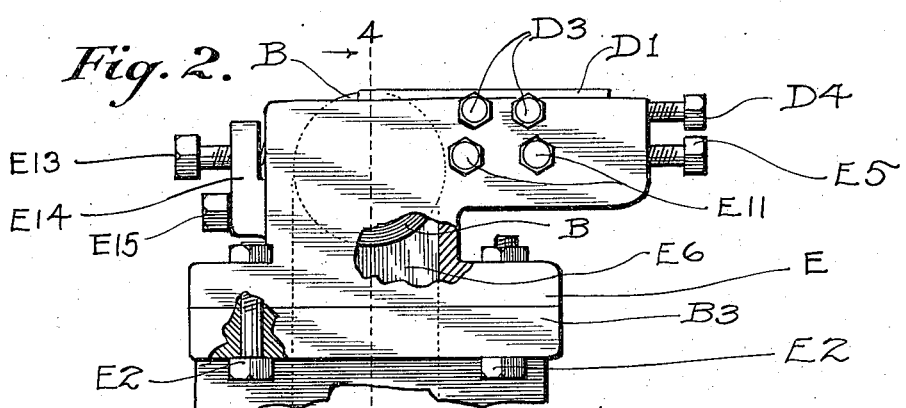
Fig. 2 is an elevation looking toward the right of the mechanism shown in Fig. 1.
Figure 4:
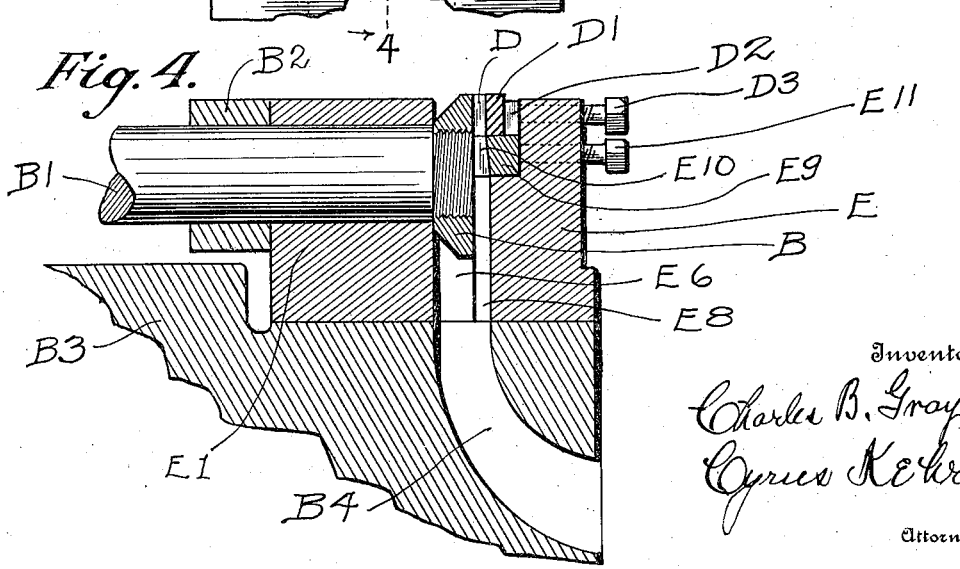
Fig. 4 is a section on the line, 4—4, of Figs. 2 and 3, looking in the direction of the arrow.

It is to be assumed that the part of the mechanism which is at the front in Figs. 1, 3 and 5, is the front of the mechanism.

Referring to Figs. 1 to 8, inclusive, A is an upper feed roller and B is a lower feed roller, corresponding, respectively, to the upper and lower feed rollers of my above-mentioned patents. A² is the upper reciprocatory cutter which corresponds to the upper reciprocatory cutter of said patents. Said cutter, A², works in conjunction with three lower cutting members, one of which is a stationary cutter bar, D, and the other of which is a stationary cutter bar, D¹, and the other of which is the lower feed roller, B, said roller serving for feeding the sheet and also as a cutting means working in conjunction with the right hand side of the reciprocatory cutter, A². The cutter bar, D, cuts in conjunction with the front edge of the reciprocatory cutter bar, and the cutter bar, D¹, cuts in conjunction with the left hand edge of the reciprocatory cutter bar.

The upper feed roller, A, is mounted on a horizontal drive shaft, A¹, resting in bearings not shown. The lower feed roller, B, is mounted on a shaft, B¹, resting in a bearing, E¹, formed in a chair, E, said shaft extending through said bearing far enough to receive the lower feed roller, B. A collar, B², surrounds the shaft at the right of the bearing and prevents leftward movement of the shaft. Said chair rests on a horizontal face formed on the lower arm or base, B³, and is there secured by upright bolts, E². The upper part of the chair has an upright channel, E³, extending from the upper face of the chair downward and from the rear end of the chair forward nearly to the front end of the latter. At the front of said channel, E³, is an upright wall, E⁴. The width of the channel from left to right equals about twice the thickness of said roller, B. From the channel, E³, a chamber, E⁶, extends downward and opens through the lower face of said chair. The length of the cross section of said chamber equals the diameter of the roller, B, and the width of the cross section of said chamber equals the thickness of said roller. In the form shown in the drawings, the bottom of the channel, E³, is at the height of the axial line of the shaft, B¹, so that the lower half of the roller, B, is in the upper part of the chamber, E⁶. Adjoining the upright wall, E⁴, the channel, E³, has a transverse downward extension, E⁷, which is formed in the casting to facilitate planing the bottom face of said channel, E³. In the right hand wall of the chamber, E⁶, is an upright channel, E⁸, extending from the channel, E³, entirely through the bottom of the chair.

Into the lower part of the channel, E³, is placed a foundation bar, E⁹. Said bar is only wide enough to fill the space in said channel at the left of the feed roller, B. Above the channel, E⁸, and in alinement therewith, the right hand face of the foundation bar, E⁹, has an upright channel, E¹⁰, opening through the upper and lower faces of the foundation bar. The channels, E⁸ and E¹⁰, are on a line which crosses the axial line of the drive shaft, B¹.

Bolts, E¹¹, are placed horizontally and at right angles to and at opposite sides of the foundation bar and extend through the upright chair walls and bear against the right side and the left side of the foundation bar to secure the latter after it has been put into the desired position. At the front end of the bar, E⁹, a set bolt, E¹², extends horizontally through the chair wall, E⁴, in position to bear against the front end of said bar. Opposite the rear end of said bar is a set bolt, E¹³, which is seated in a bracket, E¹⁴, which is secured to the chair by a bolt, E¹⁵, and directed toward and adapted to bear against the rear end of the bar, E⁹. The rear end of said bar is shown slanting, and the forward end of said bolt is shown conical, in order that when the bolt bears against the end of the bar, it will tend to press the latter downward. When said bar is to be positioned, it is placed into the channel, E³, in approximately its right position. Then it is moved endwise by driving the bolt, E¹², or the bolt, E¹³, forward, as may be needed to bring the channel, E¹⁰, of said bar into register with the upright channel, E⁸. When that has been done, the opposite set bolt, is driven forward to make engagement with the end of the bar. Then the bolts, E¹¹, are driven forward to engage said bar.

On the foundation bar, E⁹, like the two stationary cutter bars, D and D¹, the bar, D, is at the right and the bar, D¹, at the left. The bar, D, lies close to the roller, B, and has its upper face at a level with the highest part of said roller, and the width of the cutting member, D, equals the width of the upper reciprocatory cutter, $A^2$, so that the rear and working or cutting edge of the bar, D, may coöperate with the front edge of the reciprocatory cutter. The cutter bar, D, extends rearward far enough to adapt its right hand edge to work with the left hand edge of the reciprocatory cutter. At each side of the pair of cutter bars, D and $D^1$, is a bearing plate, $D^2$. Bolts, $D^3$, extend horizontally through the side walls of the chair in position to bear against the plates, $D^2$, and press the latter against the cutting bars. Opposite the front end of the cutting bars, D and $D^1$, a set bolt, $D^4$, extends through the front wall of the chair in position to be driven forward against said bars. Precise setting of the bar, $D^1$, is not needed; but the bar, D, must be set so as to bring its rear end accurately into position relative to the front edge of the upper reciprocatory cutter. To accomplish this, the bar, D, is placed with its rear or working end a little forward of the channel, $E^{10}$, the bolts $D^3$, being at the time retracted. Then the reciprocatory cutter is lowered to bring its cutting edges close to the upper level of the bars, D and $D^1$. Then the bolt, $D^4$, is driven forward until the bar, D, has been moved sufficiently to bring its cutting edge into precise relation with the reciprocatory cutter. When the bars, D and $D^1$, are put into position prior to adjustment, they are placed far enough to the left to bring the right hand edge of the bar, $D^1$, a little leftward of the channel, $E^{10}$. After the bar, D, has been adjusted as above described, the left hand bolts, $D^3$, are driven forward to bring the right hand edge of the bar, $D^1$, into accurate relation with the left hand cutting edge of the reciprocatory bar. Then the right hand set bolts, $D^3$, are driven forward to press the right hand plate, $D^2$, against the right hand face of the cutting bar, D. By this means, the two cutting bars, D and $D^1$, and the binding plates, $D^2$, are firmly clamped to each other, the cutting edges of the bars, D and $D^1$, retaining the positions given them by driving the bolt, $D^4$, and the left-hand bolts, $D^3$, forward.
The channel, $E^{10}$, extends leftward a little farther than the right hand face of the cutting bar, $D^1$, and slightly forward of the rear end of the cutting bar, D, in order that cuttings released from the sheet may readily fall through said channel and the channel, $E^8$. As soon as said cuttings are below the roller, B, they may fall rightward into the larger channel, $E^6$. Registering with the lower end of said channel is a passage, $B^4$, extending downward and leftward through the base or lower arm, $B^3$, through which cuttings fall.

It will now be observed that the rear or working ends of the cutting bars, D and $D^1$, are substantially supported to resist heavy downward pressure or blows, and that good provision is made for adjusting said bars relative to the path of the upper reciprocatory cutter. The chair, E, is well seated on the arm or base, $B^3$, and the chair forms an ample setting for the foundation bar, $E^9$, at three sides of the path of the reciprocatory cutter. Thus the foundation bar has practically the same stability that the chair, E, has. The working ends of the bars, D and $D^1$, are seated upon the foundation bar and are thus given the support of the well-supported foundation bar. Thus there can be no downward flexing of the cutter bars.
The foundation bar is to be made of quality of metal adapted to be made hard, and it is specially treated for extreme hardness, in order that it may not become battered by blows transmitted through the cutting bars, D and $D^1$. But when said bar becomes battered or chipped or broken to such extent as to make renewal desirable, it may be removed and a new bar put into its place.

In Fig. 9, the foundation bar is omitted and the bottom of the channel, $E^3$, made high enough to directly support the cutting bars, D and $D^1$. This form may be used when it is considered practicable to dispense with the special hardening and replacing of the foundation bar.

In Fig. 10, the two cutting bars, D and $D^1$, are replaced by a single cutting bar $D^5$, having a transverse cutting edge, $D^6$, to operate with the front edge of the reciprocatory cutter bar and having a lateral cutting edge, $D^7$, adapted to coöperate with the left hand edge of the reciprocatory cutter bar. This form may be used when it is deemed feasible to dispense with the better facility for tempering and grinding and replacing the individual cutting bars, D and $D^1$.

In Fig. 11, the lower roller, B, is placed slightly rightward of the path of the reciprocatory upper cutter, and a lower cutter bar, $D^8$, has an upright aperture, $D^9$, which has cutting edges positioned to coöperate with the front edge and the two side edges of the upper reciprocatory cutter, the roller, B, in this case serving merely as a forward roller, all the lower cutting being done by the cutter bar, $D^8$.

In all these variations from the form first illustrated and described, the lower cutter bars receive the substantial and direct support of the foundation bar, if the latter is used, or of the chair directly, if the foundation bar is omitted.

When the chair, E, is bolted in position on the body of the machine, the operation of the machine is the same as it would be if the chair were integral with the body of the machine. But the various parts of said chair can be better formed if it is made a distinct casting and then machined as much as is required. This machining would be difficult if this part of the machine were not cast and handled separately. Forming this chair as a distinct casting also permits the use of superior metal for that part of the machine and makes substitution easy when there is breakage at this part of the machine. By planing the face of the body of the machine upon which the chair is seated and using the bolts for securing the chair to the machine body, said chair becomes accurately and very firmly seated.

The lower roller, B, is secured to the shaft, $B^1$, by placing the roller into the chamber, $E^6$, and then moving the shaft leftward through the bearing, $B^2$, and turning the shaft into the roller.

I claim as my invention,

1. In a machine for cutting sheet metal, the combination of a body having a horizontal, upward-directed supporting face close to the below-mentioned reciprocatory cutter path, a reciprocatory cutter perpendicular to and above said supporting face and having lateral cutting edge portions extending to two lines which are parallel to each other and to the course of the sheet, and two members, standing in opposition to each other and adapted to receive a metal sheet between them and one being driven, for supporting and feeding said metal sheet and forming a turning point therefor near the path of the reciprocatory cutter, and a stationary cutter having its working part receiving support from said supporting face and being close to the path of the reciprocatory cutter, and means for positioning and securing said stationary cutter, substantially as described.

2. In a machine for cutting sheet metal, the combination of a body having a horizontal, upward-directed supporting face close to the below-mentioned reciprocatory cutter path, two members, standing in opposition to each other and adapted to receive a metal sheet between them and one being rotary and driven, for supporting and feeding said metal sheet and forming a turning point therefor, a reciprocatory cutter perpendicular to and above said supporting face and having a path passing through the plane of said sheet near said turning point and said cutter having lateral cutting edge portions extending to two lines which are parallel to each other and to the course of the sheet, and a stationary cutter having its working part receiving support from said supporting face and being close to the path of the reciprocatory cutter, and means for positioning and securing said stationary cutter, substantially as described.

3. In a machine for cutting sheet metal, the combination of a body having a horizontal, upward-directed supporting face close to the below-mentioned reciprocatory cutter path, two rotary members, standing near said supporting face and in opposition to each other and adapted to receive a metal sheet between them and one being driven, for supporting and feeding said metal sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a stationary cutter located below the sheet plane and rising to the level of the upper part of the lower feed member and having its working part receiving support from said supporting face close to said path, substantially as described.

4. In a machine for cutting sheet metal, the combination of a body having a horizontal, upward-directed supporting face close to the below-mentioned reciprocatory cutter path, two rotary members, standing near said supporting face and in opposition to each other and adapted to receive a metal sheet between them and one being driven, for supporting and feeding said metal sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines which are parallel to each other and to the course of the sheet and one of which edge portions is adapted to work in conjunction with the lower of said rotary feed members for cutting, and a stationary cutter located below the sheet plane and rising to the level of the upper part of the lower feed member and adapted to work in conjunction with the reciprocatory cutter and having its working part receiving support from said supporting face close to said path, and means for positioning and securing said stationary cutter, substantially as described.

5. In a machine for cutting sheet metal, the combination of a body having a horizontal, upward-directed supporting face close to the below-mentioned reciprocatory cutter path, two rotary members, standing near said supporting face and in opposition to each other and adapted to receive a metal sheet between them and one being driven, for supporting and feeding said metal sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines and one of which edge portions is adapted to work in conjunction with the lower of said rotary feed members for cutting, and two stationary cutters located below the sheet plane and rising to the level of the upper part of the lower feed member and adapted to work in conjunction with the reciprocatory cutter and having their working parts receiving support from said supporting face close to said path, substantially as described.

6. In a machine for cutting sheet metal, the combination of a body having a horizontal, upward-directed supporting face close to the below-mentioned reciprocatory cutter bar, a foundation bar resting on said supporting face close to said path, a reciprocatory cutter perpendicular to and above said supporting face and having lateral cutting edge portions extending to two lines which are parallel to each other and to the course of the sheet, and two members, standing in opposition to each other and adapted to receive a metal sheet between them and one being driven, for supporting and feeding said metal sheet and forming a turning point therefor near the path of the reciprocatory cutter, and a stationary cutter having its working part resting upon said foundation bar close to the path of the reciprocatory cutter, and means for positioning and securing said stationary cutter, substantially as described.

7. In a machine for cutting sheet metal, the combination of a body having a horizontal, upward-directed supporting face close to the below-mentioned reciprocatory cutter path, two members, standing in opposition to each other and adapted to receive a metal sheet between them and one being rotary and driven, for supporting and feeding said metal sheet and forming a turning point therefor, a reciprocatory cutter perpendicular to and above said supporting face and having a path passing through the plane of said sheet near said turning point and said cutter having lateral edge cutting portions extending to the lines which are parallel to each other and to the course of the path, and a stationary cutter having its working part resting upon said foundation bar close to the path of the reciprocatory cutter, substantially as described.

8. In a machine for cutting sheet metal, the combination of a body having a horizontal, upward-directed supporting face close to the below-mentioned reciprocatory cutter path, a foundation bar resting on said supporting face close to said path, two rotary members, standing near said supporting face and in opposition to each other and adapted to receive a metal sheet between them and one being driven, for supporting and feeding said metal sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a stationary cutter having its working part resting upon said foundation bar close to the path of the reciprocatory cutter, and means for positioning and securing said stationary cutter, substantially as described.

9. In a machine for cutting sheet metal, the combination of walls forming an upright chamber, a lower roller located in said chamber, walls forming a horizontal channel adjacent said roller, walls forming an upright channel having its upper end communicating with said horizontal channel, and being open at its lower end, an upright reciprocatory cutter, and a stationary cutter working in conjunction with the reciprocatory cutter, substantially as described.

10. In a machine for cutting sheet metal, the combination of walls forming an upright chamber, a lower roller located in said chamber, walls forming a horizontal channel adjacent said roller, walls forming an upright channel having its upper end communicating with said horizontal channel, walls forming a discharge passage communicating with said chamber and said upright channel, an upright reciprocatory cutter, and a stationary cutter working in conjunction with the reciprocatory cutter, substantially as described.

11. In a machine for cutting sheet metal, the combination of walls forming an upright chamber, a lower roller located in said chamber, walls forming a horizontal channel adjacent said roller, a foundation bar located in said horizontal channel and having a channel in line with the path of the below-mentioned reciprocatory cutter, walls forming an upright channel having its upper end communicating with the channel of the foundation bar and having its lower end open, and an upright reciprocatory cutter, and a stationary cutter working in conjunction with the reciprocatory cutter, substantially as described.

12. In a machine for cutting sheet metal, the combination of a body, a chair seated on said body and having a horizontal, upward-directed supporting face close to the below-mentioned reciprocatory cutter path, a reciprocatory cutter perpendicular to and above said supporting face and having lateral cutting edge portions extending to two lines which are parallel to each other and to the course of the sheet, and two members, standing in opposition to each other and adapted to receive a metal sheet between them and one being driven, for supporting and feeding said metal sheet and forming a turning point therefor near the path of the reciprocatory cutter, and a stationary cutter having its working part receiving support from said supporting face and being close to the path of the reciprocatory cutter, and means for positioning and securing said stationary cutter, substantially as described.

13. In a machine for cutting sheet metal, the combination of a body, a chair seated on said body and having a horizontal, upward-directed supporting face close to the below-mentioned reciprocatory cutter path, two members, standing in opposition to each other and adapted to receive a metal sheet between them and one being rotary and driven, for supporting and feeding said metal sheet and forming a turning point therefor, a reciprocatory cutter perpendicular to and above said supporting face and having a path passing through the plane of said sheet near said turning point and said cutter having lateral cutting edge portions extending to two lines which are parallel to each other and to the course of the sheet, and a stationary cutter having its working part receiving support from said supporting face and being close to the path of the reciprocatory cutter, and means for positioning and securing said stationary cutter, substantially as described.

14. In a machine for cutting sheet metal, the combination of a body, a chair seated on said body and having a horizontal, upward-directed supporting face close to the below-mentioned reciprocatory cutter path, two rotary members, standing near said supporting face and in opposition to each other and adapted to receive a metal sheet between them and one being driven, for supporting and feeding said metal sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a stationary cutter located below the sheet plane and rising to the level of the upper part of the lower feed member and having its working part receiving support from said supporting face close to said path, substantially as described.

15. In a machine for cutting sheet metal, the combination of a body, a chair seated on said body and having a horizontal, upward-directed supporting face close to the below-mentioned reciprocatory cutter path, two rotary members, standing near said supporting face and in opposition to each other and adapted to receive a metal sheet between them and one being driven, for supporting and feeding said metal sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines which are parallel to each other and to the course of the sheet and one of which edge portions is adapted to work in conjunction with the lower of said rotary feed members for cutting, and a stationary cutter located below the sheet plane and rising to the level of the upper part of the lower feed member and adapted to work in conjunction with the reciprocatory cutter and having its working part receiving support from said supporting face close to said path, and means for positioning and securing said stationary cutter, substantially as described.

16. In a machine for cutting sheet metal, the combination of a body, a chair seated on said body and having a horizontal, upward-directed supporting face close to the below-mentioned reciprocatory cutter path, two rotary members, standing near said supporting face and in opposition to each other and adapted to receive a metal sheet between them and one being driven, for supporting and feeding said metal sheet and forming a turning point therefor and the lower of said rotary members serving also as a cutter working in conjunction with one side of the below-mentioned reciprocatory cutter, a reciprocatory cutter having a path directed toward said supporting face and passing through the plane of said sheet near said turning point and said cutter having lateral cutting edge portions extending to two lines which are parallel to each other and to the course of the sheet and one of which edge portions is adapted to work in conjunction with the lower of said rotary feed members for cutting, and two stationary cutters located below the sheet plane and rising to the level of the upper part of the lower feed member and adapted to work in conjunction with the reciprocatory cutter and having their working parts receiving support from said supporting face close to said path, substantially as described.

17. In a machine for cutting sheet metal, the combination of a body, a chair seated on said body and having a horizontal, upward-directed supporting face close to the below-mentioned reciprocatory cutter bar, a foundation bar resting on said supporting face close to said path, a reciprocatory cutter perpendicular to and above said supporting face and having lateral cutting edge portions extending to two lines which are parallel to each other and to the course of the sheet, and two members, standing in opposition to each other and adapted to receive a metal sheet between them and one being driven, for supporting and feeding said metal sheet and forming a turning point therefor near the path of the reciprocatory cutter, and a stationary cutter having its working part resting upon said foundation bar close to the path of the reciprocatory cutter, and means for positioning and securing said stationary cutter, substantially as described.

18. In a machine for cutting sheet metal, the combination of a body, a chair seated on said body and having a horizontal, upward-directed supporting face close to the below-mentioned reciprocatory cutter path, two members, standing in opposition to each other and adapted to receive a metal sheet between them and one being rotary and driven, for supporting and feeding said metal sheet and forming a turning point therefor, a reciprocatory cutter perpendicular to and above said supporting face and having a path passing through the plane of said sheet near said turning point and said cutter having lateral edge cutting portions extending to two lines which are parallel to each other and to the course of the path, and a stationary cutter having its working part resting upon said foundation bar close to the path of the reciprocatory cutter, substantially as described.

19. In a machine for cutting sheet metal, the combination of a body, a chair seated on said body and having a horizontal, upward-directed supporting face close to the below-mentioned reciprocatory cutter path, a foundation bar resting on said supporting face close to said path, two rotary members, standing near said supporting face and in opposition to each other and adapted to receive a metal sheet between them and one being driven, for supporting and feeding said metal sheet and forming a turning point therefor, a reciprocatory cutter having a path directed toward said supporting face and passing through the plane of said sheet near said turning point and said cutter having lateral cutting edge portions extending to two lines which are parallel to each other and to the course of the sheet, and a stationary cutter having its working part resting upon said foundation bar close to the path of the reciprocatory cutter, and means for positioning and securing said stationary cutter, substantially as described.

20. In a machine for cutting sheet metal, the combination of a chair having walls forming an upright chamber, a lower roller located in said chamber, walls forming a horizontal channel adjacent said roller, walls forming an upright channel having its upper end communicating with said horizontal channel, and being open at its lower end, substantially as described.

21. In a machine for cutting sheet metal, the combination of a chair having walls forming an upright chamber, a lower roller located in said chamber, walls forming a horizontal channel adjacent said roller, a foundation bar located in said horizontal channel and having a channel in line with the path of the below-mentioned reciprocatory cutter, walls forming an upright channel having its upper end communicating with the channel of the foundation bar and having its lower end open, an upright reciprocatory cutter, and a stationary cutter seated on the foundation bar, substantially as described.

22. In a machine for cutting sheet metal, the combination of a body, a chair on the body, the body and the chair having bearings adjacent to and in alinement with each other, a drive shaft extending through said two bearings, a lower roller on said shaft, an upper feed member adapted to work in conjunction with said roller for feeding a sheet, a reciprocatory cutter perpendicular to the sheet plane and having lateral cutting edge portions extending to two lines which are parallel to each other and to the course of the sheet, and a stationary cutter adapted to work in conjunction with the reciprocatory cutter close to the place of engagement of the members, substantially as described.

In testimony whereof I have signed my name this 2nd day of May, in the year one thousand nine hundred and eighteen.

CHARLES B. GRAY.

Copies of this patent may be obtained for five cents each, by addressing the "Commissioner of Patents, Washington, D. C."